(No Model.)

F. J. WILLARD.
RUBBER ATTACHMENT FOR PEDALS.

No. 581,095. Patented Apr. 20, 1897.

Witnesses,

Inventor,
Frank J. Willard
By Dewey & Co.
Attys

UNITED STATES PATENT OFFICE.

FRANK J. WILLARD, OF SACRAMENTO, CALIFORNIA.

RUBBER ATTACHMENT FOR PEDALS.

SPECIFICATION forming part of Letters Patent No. 581,095, dated April 20, 1897.

Application filed August 31, 1896. Serial No. 604,455. (No model.)

*To all whom it may concern:*

Be it known that I, FRANK J. WILLARD, a citizen of the United States, residing at Sacramento, county of Sacramento, State of California, have invented an Improvement in Rubber Attachments for Bicycle-Pedals; and I hereby declare the following to be a full, clear, and exact description of the same.

My invention relates generally to the class of bicycle attachments, and particularly to the class of pedals for bicycles and other velocipedes.

My invention consists in the novel rubber attachment for the pedals, which I shall hereinafter fully describe.

The pedals of bicycles and other velocipedes may be divided, generally speaking, into three main classes—namely, those known as "rat-trap" pedals, those known as "rubber" pedals, and what may be termed an "ordinary" or "plain" pedal, not necessarily a rat-trap, but yet unprovided with rubber. Some pedals are interchangeable, by which is meant that one side may be plain or rat-trap and the other side may be rubber, or it may also mean that rubber pieces are adapted to be inserted in a metallic pedal when required or desired.

It is the object of my invention to provide such a construction as will enable me to readily attach rubber pieces to other forms of pedals, as, for example, to the rat-trap pedal or to any plain metallic pedal.

Figure 1:
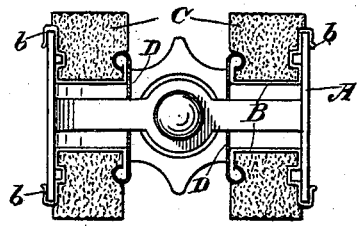
Figure 2:
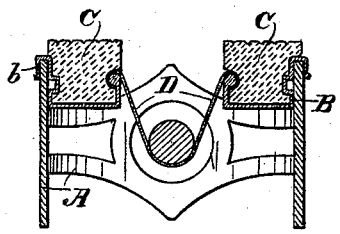
Figure 3:
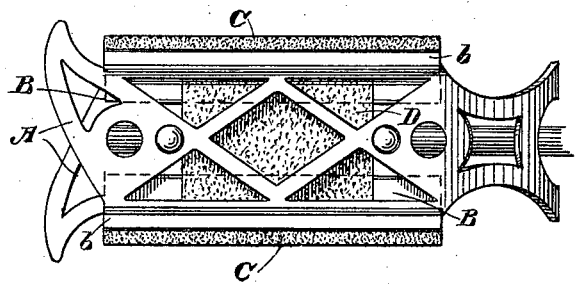

Referring to the accompanying drawings, Figure 1 is a cross-section of a pedal, showing my rubber attachment disposed in one way. Fig. 2 is a section showing it disposed in another way. Fig. 3 is a side elevation of the pedal, the attachment being disposed as in Fig. 1.

A represents a pedal which may stand for any pedal unprovided with rubber. In the present instance it is shown as the ordinary form of a rat-trap pedal.

My attachment consists of a frame B, preferably of metal, said frame being shaped to embrace and hold the rubber strip C, here shown as by clamping its base tightly, said rubber strip projecting above the frame and being corrugated or otherwise roughened, as is usual. One edge of the frame is bent over to form a flange $b$. There are two of these frames and rubbers to form a connected pair, and the connection may be made in any suitable manner which will enable the members of the pair to be separated sufficiently to be fitted to the pedal by their flanges and then to be tightened thereon, so that they will hold. Various connections may be employed for this purpose, such as a screw or other adjustable rigid device, but the best form of a connection is that of a spring which will enable the members of the pair to be stretched away from each other to be fitted to place and will contract them when in place sufficiently to hold them there. Any suitable spring may be employed, but I prefer and deem the best form of spring to be that of a strip of rubber D, the edges of which are caught by the opposing frames and held firmly. This rubber strip is on the side of the frames opposite to that of their holding-flanges $b$.

In adjusting the frames to the pedal their flanges $b$ are fitted over the edges of the pedal, and the rubber connecting-strip will hold them there tightly. To remove them, they have but to be stretched apart and slipped off.

Each pair of frames and rubbers may be put upon the pedal in various ways, as, for example, one member may be caused to engage with one edge of one side of the pedal and the other with the opposite edge of the same side, and a corresponding pair be fitted to the other side of the pedal in a similar manner, Figs. 1 and 3. In such a case the whole pedal will be transformed into a rubber pedal on both surfaces. Or a single pair may be fitted transversely to the pedal, one member being fitted to each side thereof, the intervening elastic piece passing under the central shaft of the pedal, so that they are held well in place, Fig. 2. A single pair would thus give a pedal with rubber on one surface, leaving the other surface plain or rat-trap, as might be.

Having thus described my invention, what I claim as new, and desire to secure by Letters Patent, is—

1. A rubber attachment for pedals consisting of a pair of rubber strips or pieces and a pair of frames exterior of and adapted to clamp the bases of said strips, each of said frames having a laterally-projecting flange adapted to engage the edges of the pedal, and a spring connecting the frames whereby they can be stretched to fit the pedal and be held there by the tension of the spring.

2. A rubber attachment for pedals, consisting of a pair of rubber pieces and a pair of frames clamping exteriorly the bases of the strips, and having flanges projecting laterally from one side and adapted to engage the edges of the pedal, and an elastic piece having its ends connected with the inner sides of the frame and having its intermediate portion adapted to be passed under the shaft of the pedal.

3. A rubber attachment for pedals consisting of a pair of frames, each frame being provided with a laterally-projecting flange on one edge adapting it to be adjusted to the edges of the pedal, rubber pieces having their bases fitted into and clamped by the frames and a spring-piece connecting the sides of the frames opposite to those upon which the flanges are formed, whereby the frames may be readily fitted to the pedal and held in place.

In witness whereof I have hereunto set my hand.

FRANK J. WILLARD.

Witnesses:
JOHN F. LUSBY,
C. RODONI.